(12) United States Patent
Liu

(10) Patent No.: US 12,230,943 B2
(45) Date of Patent: Feb. 18, 2025

(54) STRIPPING DEVICE

(71) Applicant: TRIPLE WIN TECHNOLOGY(SHENZHEN) CO.LTD., Shenzhen (CN)

(72) Inventor: Song-Hao Liu, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 361 days.

(21) Appl. No.: 17/738,160

(22) Filed: May 6, 2022

(65) Prior Publication Data

US 2022/0399703 A1 Dec. 15, 2022

(30) Foreign Application Priority Data

Jun. 10, 2021 (CN) .......................... 202110648035.6

(51) Int. Cl.
*H02G 1/12* (2006.01)
(52) U.S. Cl.
CPC ................................. *H02G 1/1221* (2013.01)
(58) Field of Classification Search
CPC .. H02G 1/1224; H02G 1/1212; H02G 1/1236; H02G 1/1221; H02G 1/1253; H02G 1/1297; H02G 1/1231; H02G 1/12; H02G 1/1204; H02G 1/1258; H02G 1/1285; H02G 1/1202; H02G 1/1209; H02G 1/1248; H02G 1/005; H02G 1/1207; H02G 1/1219; B25B 7/02; B25B 15/02; B25B 7/18; B25B 25/00; B25B 33/00; B25B 7/10; B25B 1/205
See application file for complete search history.

(56) References Cited

U.S. PATENT DOCUMENTS

| 3,600,983 | A * | 8/1971 | Hendry | H02G 1/1224 30/90.1 |
| 3,869,791 | A * | 3/1975 | Horrocks | H02G 1/1226 30/90.1 |
| 6,351,865 | B1 * | 3/2002 | De Donato | H02G 1/005 7/107 |
| 2003/0188432 | A1 * | 10/2003 | Temple | H02G 1/1229 30/90.6 |
| 2007/0000359 | A1 * | 1/2007 | Tansbo | A01L 11/00 7/142 |

FOREIGN PATENT DOCUMENTS

| CN | 206225909 | * | 6/2017 |
| CN | 107681566 | * | 2/2018 |
| CN | 110994475 A | * | 4/2020 |
| GB | 2413440 | * | 10/2007 |
| TW | 276369 B | | 5/1996 |

* cited by examiner

*Primary Examiner* — Robert J Scruggs
(74) *Attorney, Agent, or Firm* — ScienBiziP, P.C.

(57) ABSTRACT

A stripping device for rapid midpoint stripping of an outer cladding layer of a cable includes a handle, a cutter disposed on the handle, a pressing assembly, and a scraper assembly. The pressing assembly includes a first bracket and a pressing part. The first bracket is disposed on the handle. The pressing part is slidably arranged on the first bracket and opposite to the cutter. The scraper assembly includes a second bracket disposed on the handle and a scraper disposed on the second bracket. The stripping device has advantages of simple operation, high stripping efficiency, and good safety.

16 Claims, 9 Drawing Sheets

STRIPPING DEVICE

FIELD

The subject matter herein generally relates to stripping devices, and more particularly to a stripping device for stripping off a segment of an outer cladding layer of a cable.

BACKGROUND

Currently, a cable stripping device is only capable of stripping off the ends, or near the ends, of an outer cladding layer of a cable, and is unable to strip off segments of the outer cladding layer at a middle portion of the cable. These middle-portion segments of the outer cladding layer can only be stripped manually, which reduces stripping efficiency.

BRIEF DESCRIPTION OF THE DRAWINGS

Implementations of the present technology will now be described, by way of embodiment, with reference to the attached figures.

DETAILED DESCRIPTION

Figure 1:
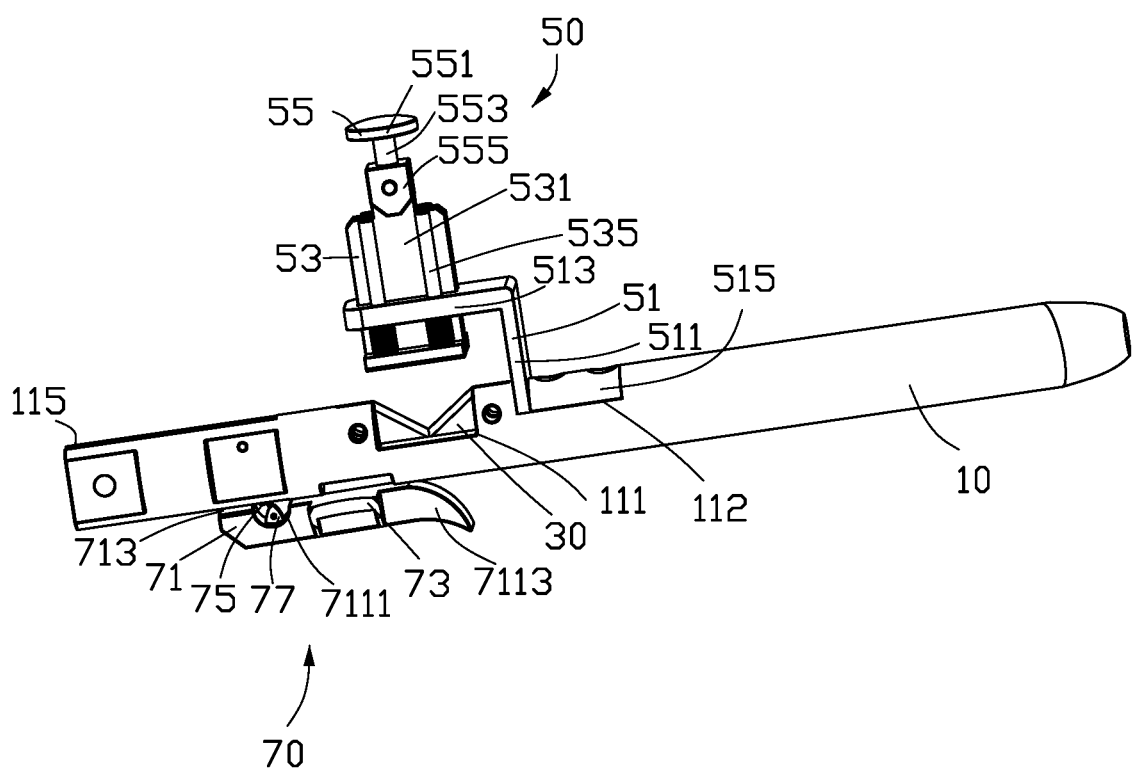
FIG. 1 is a perspective view of a stripping device according to an embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, when a first component is referred to as "connecting" to a second component, it is to indicate that the first component may be directly connected to the second component or may be indirectly connected to the second component via a third component between them. When a first component is referred to as "disposed to" a second component, it is intended that the first component may be directly disposed to the second component or may be indirectly disposed to the second component via a third component between them.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The term "and/or" used herein includes any suitable combination of one or more related items listed.

Figure 3:
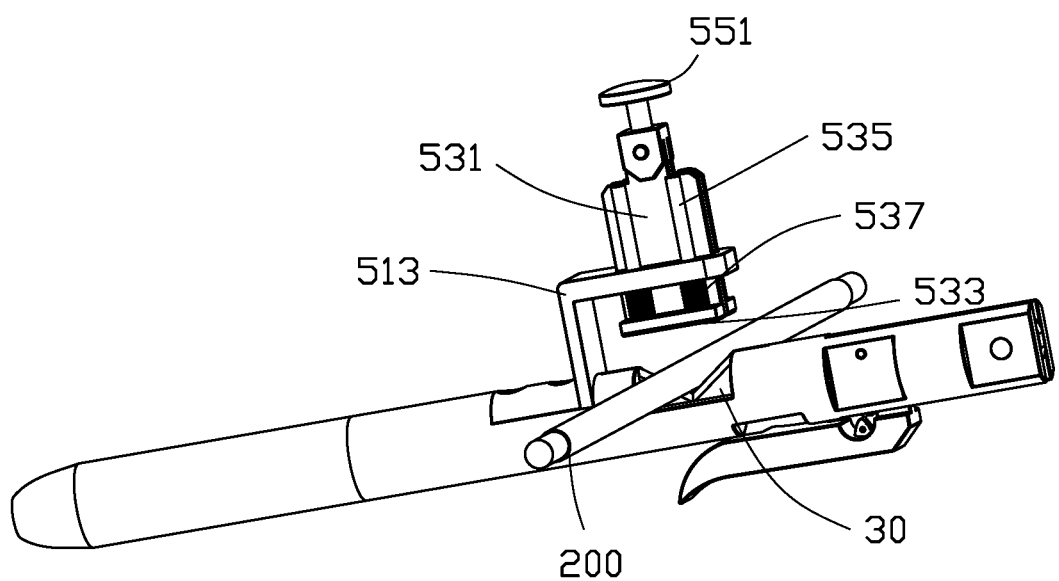
FIG. 3 is a schematic structural diagram of the stripping device and a cable according to an embodiment of the present disclosure.

Referring to FIGS. 1 and 3, an embodiment of a stripping device 100 for stripping off an outer cladding layer of a cable 200 is provided. The stripping device 100 includes a handle 10, a cutter 30 disposed on the handle 10, a pressing assembly 50, and a scraper assembly 70. The pressing assembly 50 includes a first bracket 51 and a pressing part 53. The first bracket 51 is disposed on the handle 10. The pressing part 53 is slidably arranged on the first bracket 51 and is opposite to the cutter 30. The scraper assembly 70 includes a second bracket 71 disposed on the handle 10 and a scraper 73 disposed on the second bracket 71.

The handle 10 defines a first accommodation groove 111, and the cutter 30 is accommodated in the first accommodation groove 111. In one embodiment, the cutter 30 is detachably accommodated in the first accommodation groove 111.

Figure 2:
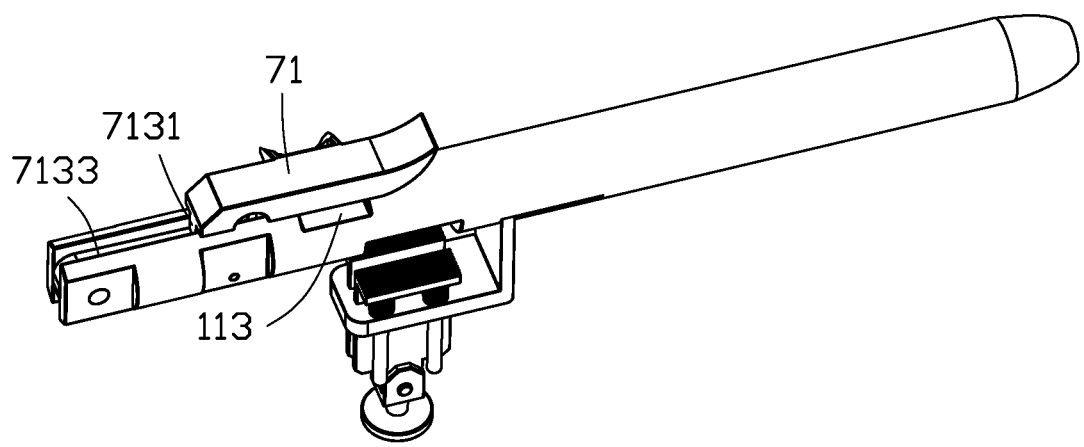
FIG. 2 is similar to FIG. 1, but viewed from another angle.

Referring to FIGS. 2 and 3, the handle 10 defines a second accommodation groove 113. The second bracket 71 is opposite to the second accommodation groove 113, so that the cable 200 can be held by a bottom wall of the second accommodation groove 113 and the second bracket 71. In one embodiment, the first accommodation groove 111 and the second accommodation groove 113 are located on both sides of the handle 10 respectively.

In one embodiment, a blade of the scraper 73 is arranged parallel to an axis of the handle 10 to facilitate a peeling off of the outer cladding layer of the cable 200. In one embodiment, the scraper 73 is detachably disposed on the second bracket 71.

The cutter 30 may be a V-shaped blade, a plane blade, or an arcing blade. In one embodiment, the cutter 30 is a V-shaped blade, facilitating the rotary cutting of cables 200 with different outer diameters.

In one embodiment, the blade of the scraper 73 is crescent-shaped, which reduces a contact area between the scraper 73 and the cable 200. It is time-saving and effortless for a user to strip off the outer cladding layer of the cable 200 by using such scraper.

In one embodiment, the stripping device 100 further includes a first protective casing (not shown) detachably sleeved on the cutter 30 and a second protective casing (not shown) detachably sleeved on the scraper 73 to prevent accidental injury. It is to be understood that when using the stripping device 100, the first protective casing and the second protective casing are removed. The first protective casing and the second protective casing may be made of rubber.

In one embodiment, a length of the stripping device 100 may be 100 to 200 millimeters, such as 100 mm, 150 mm, or 200 mm. A diameter of the handle 10 is 10 to 15 millimeters, such as 10 mm, 12 mm, or 15 mm. The stripping device 100 can strip off the outer cladding layer of a single core or multi-core cable with an outer diameter of 1.5 to 50 mm.

Figure 4:
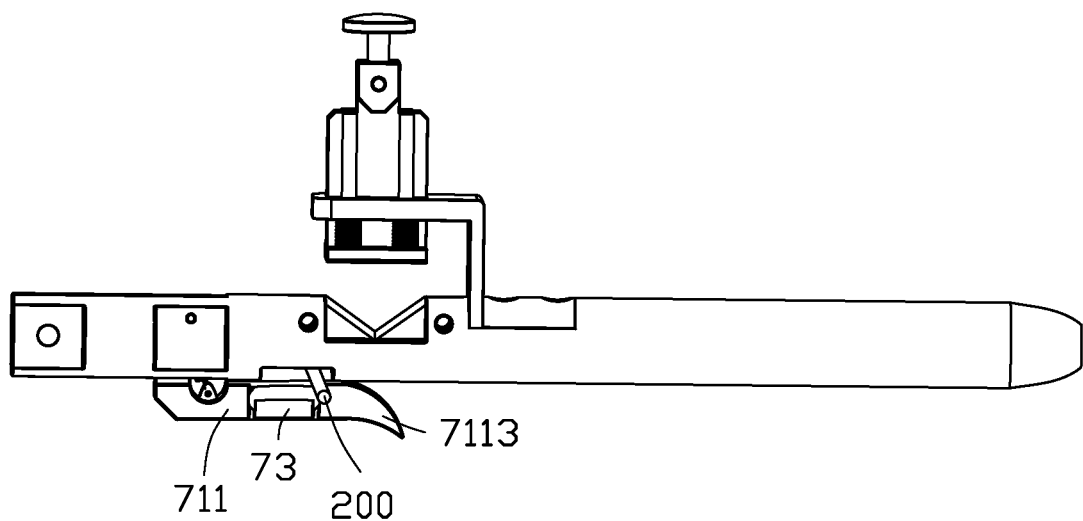
FIG. 4 is another schematic structural diagram of the stripping device and the cable according to an embodiment of the present disclosure.

When it is necessary to strip off segments of the outer cladding layer at a middle portion of the cable 200, the cable 200 is placed between the cutter 30 and the pressing part 53 (see FIG. 3), and the pressing part 53 presses against the cable 200 to prevent the cable 200 from moving. The cable 200 or the stripping device 100 is rotated to form a first notch at a first position of the outer cladding layer at the middle portion of the cable 200. Then the cable 200 is moved until a second position of the outer cladding layer at the middle portion of the cable 200 is placed between the cutter 30 and the pressing part 53. The cable 200 or the stripping device 100 is rotated to form a second notch at the second position. Then the cable 200 is placed between the scraper 73 and the handle 10 (see FIG. 4), and the scraper 73 scrapes off the outer cladding layer between the first notch and the second notch, removing the outer cladding layer at the middle portion of the cable 200. The stripping device 100 of the present disclosure has the advantages of simple operation, high stripping efficiency, and good safety.

The stripping device 100 can further strip off segments of the outer cladding layer at both ends of the cable 200. Specifically, a third position of the outer cladding layer at an end of the cable 200 is placed between the cutter 30 and the pressing part 53, then the cable 200 or the stripping device 100 is rotated to form a third notch, then a part of the outer cladding layer at the end of the cable 200 is stripped off through the third notch.

When the cable 200 is rotated and cut, relative positions of the handle 10 and the cable 200 need to remain unchanged, so as to obtain a circular or oval cut.

In one embodiment, the stripping device 100 has a pen shape.

Figure 5:
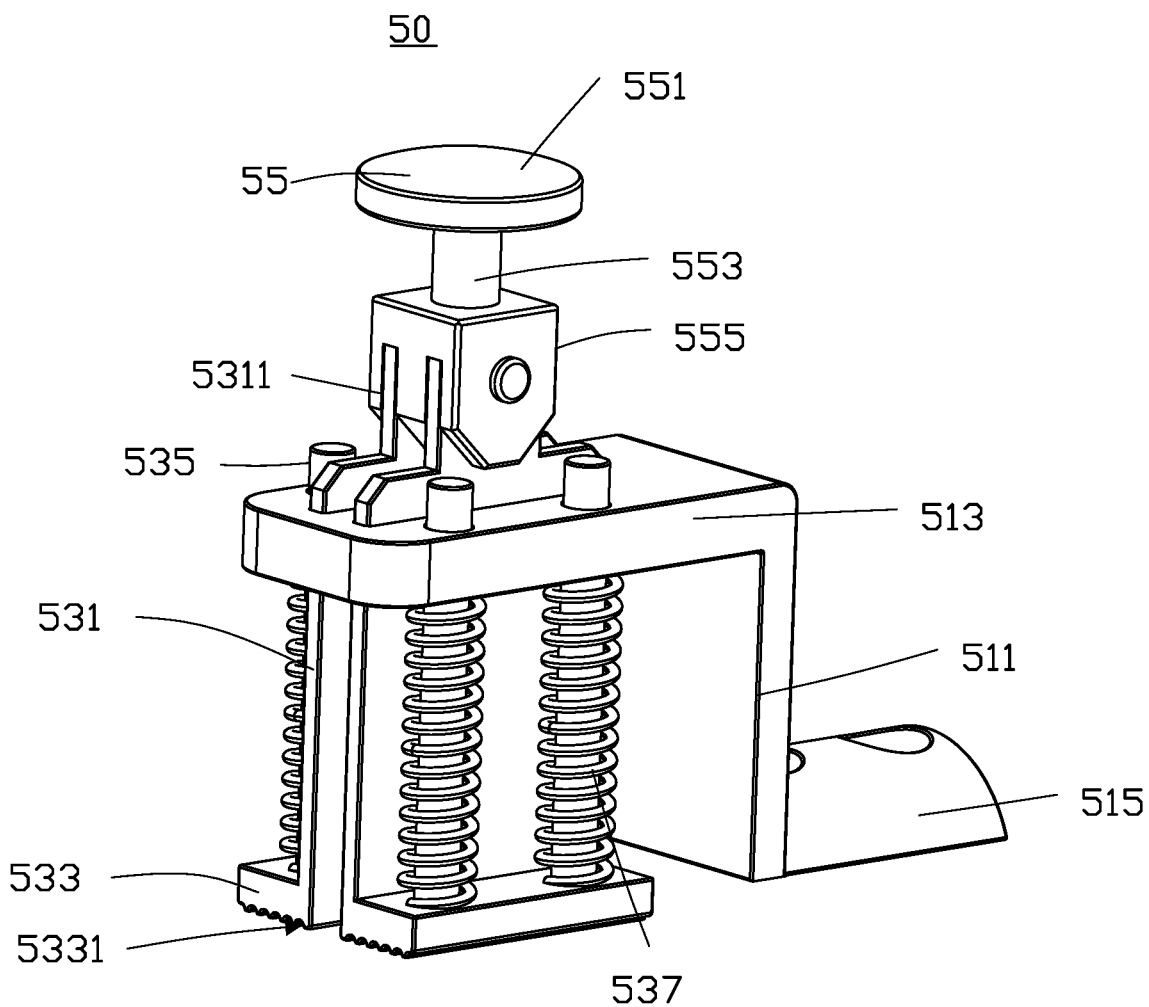
FIG. 5 is a perspective view of a pressing assembly of the stripping device of FIG. 1.
Figure 6:
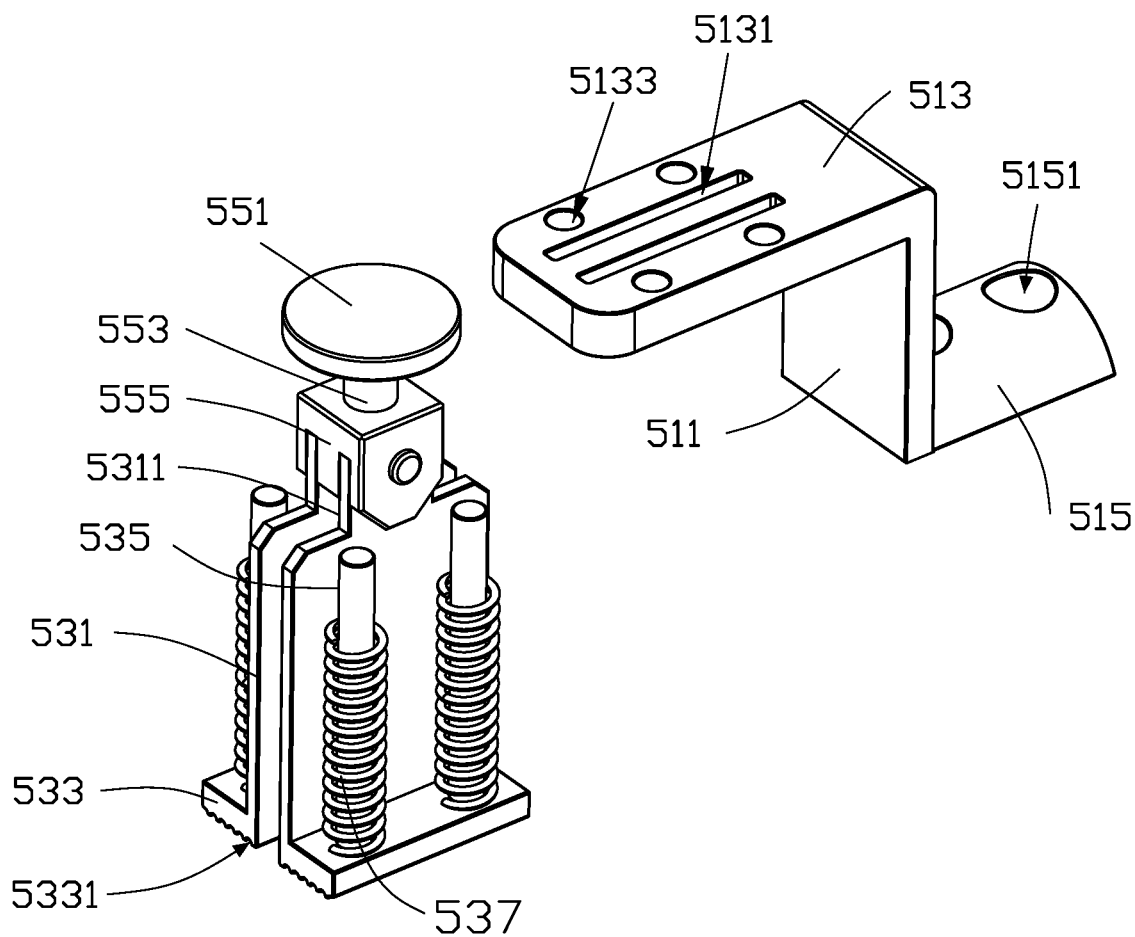
FIG. 6 is an exploded view of the pressing assembly of FIG. 5.

Referring to FIGS. 5 and 6, the first bracket 51 includes a support plate 511 disposed on the handle 10 and a stop plate 513 connected at an angle with the support plate 511 and opposite to the cutter 30. The stop plate 513 defines at least one sliding groove 5131. The pressing part 53 includes at least one sliding plate 531 and at least one pressing plate 533 connected at an angle with the at least one sliding plate 531. The at least one sliding plate 531 is slidably accommodated in the at least one sliding groove 5131. The at least one pressing plate 533 is located between the stop plate 513 and the cutter 30.

In one embodiment, the handle 10 defines a connecting groove 112 (shown in FIG. 1). The first bracket 51 further includes a connecting plate 515 accommodated in the connecting groove 112. The connecting plate 515 is connected at an angle with the support plate 511. In one embodiment, the connecting plate 515 is vertically connected with the support plate 511.

In one embodiment, the support plate 511 is vertically connected with the stop plate 513. In one embodiment, the at least one sliding plate 531 is vertically connected with the at least one pressing plate 533.

In one embodiment, a surface of the pressing plate 533 facing the cutter 30 defines a plurality of first grooves 5331 spaced from each other, so as to increase the friction between the pressing plate 533 and the cable 200 and prevent the cable 200 from moving during stripping.

In one embodiment, the stop plate 513 defines two sliding grooves 5131 spaced from each other, and the pressing part 53 includes two opposite sliding plates 531 and two opposite pressing plates 533. Each of the sliding plates 531 is slidably accommodated in one of the sliding grooves 5131, and each of the pressing plates 533 is connected at an angle with one of the sliding plates 531.

When the pressing part 53 is lifted, the at least one sliding plate 531 may slide towards the cutter 30 in the at least one sliding groove 5131, so as to place the cable 200 between the cutter 30 and the pressing plate 533. The pressing plate 533 can press against the cable 200 to prevent the cable 200 from moving during stripping.

Referring to FIGS. 5 and 6, the pressing part 53 further includes a pressing head 55. The pressing head 55 includes a head 551, a connecting rod 553 connected with the head 551, and a connecting block 555 connecting the connecting rod 553 with the sliding plate 531.

In one embodiment, at least one protrusion 5311 is disposed on an end of the at least one sliding plate 531 away from the pressing plate 533. The protrusion 5311 is connected with the connecting block 555.

The stop plate 513 defines at least one opening 5133 spaced from the at least one sliding groove 5131. The pressing part 53 includes at least one sliding rod 535 disposed on the pressing plate 533 and extending through the at least one opening 5133, and at least one first elastic member 537 sleeved on the at least one sliding rod 535. The at least one first elastic member 537 is located between the stop plate 513 and the pressing plate 533. In one embodiment, the first elastic member 537 may be a spring.

When the pressing part 53 is lifted, the at least one sliding plate 531 may slide away from the cutter 30 in the at least one sliding groove 5131, and the pressing plate 533 and the stop plate 513 will press against the first elastic member 537, so that the first elastic member 537 is compressed. After the cable 200 is placed between the cutter 30 and the pressing plate 533, the first elastic member 537 restores and pushes the at least one sliding plate 531 to slide towards the cutter 30 in the at least one sliding groove 5131, driving the pressing plate 533 to press against the cable 200, thereby preventing an axial movement of the cable 200 while allowing a radial rotation of the cable 200 and/or the stripping device 100. Moreover, the first elastic member 537 in the compressed state can push the at least one sliding plate 531 and the pressing plate 533 to slide towards the cutter 30, which can prevent accidental injury.

Figure 7:
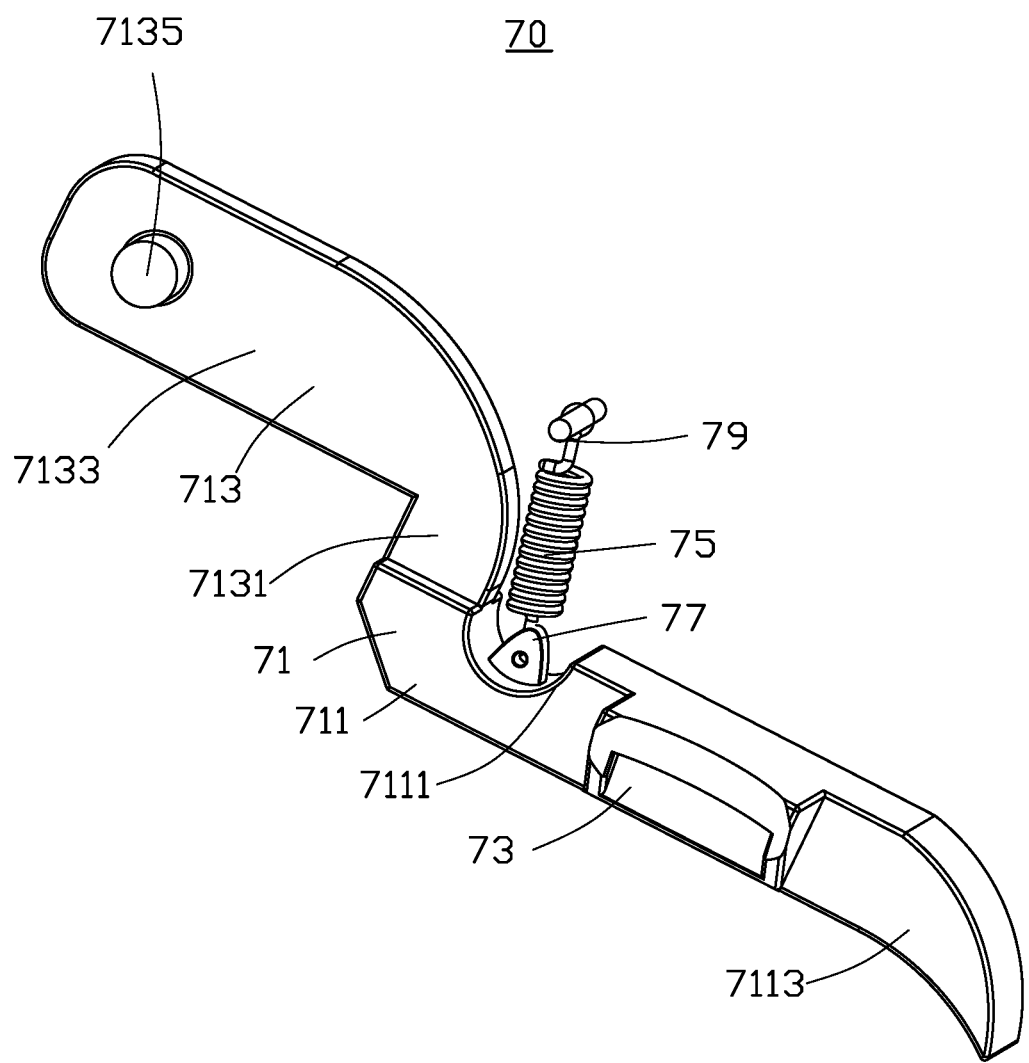
FIG. 7 is a perspective view of a scraper assembly of the stripping device of FIG. 1.

Referring to FIG. 7, the second bracket 71 includes a support section 711 for supporting the scraper 73 and a connecting portion 713 connected at an angle with the support section 711.

Figure 8:
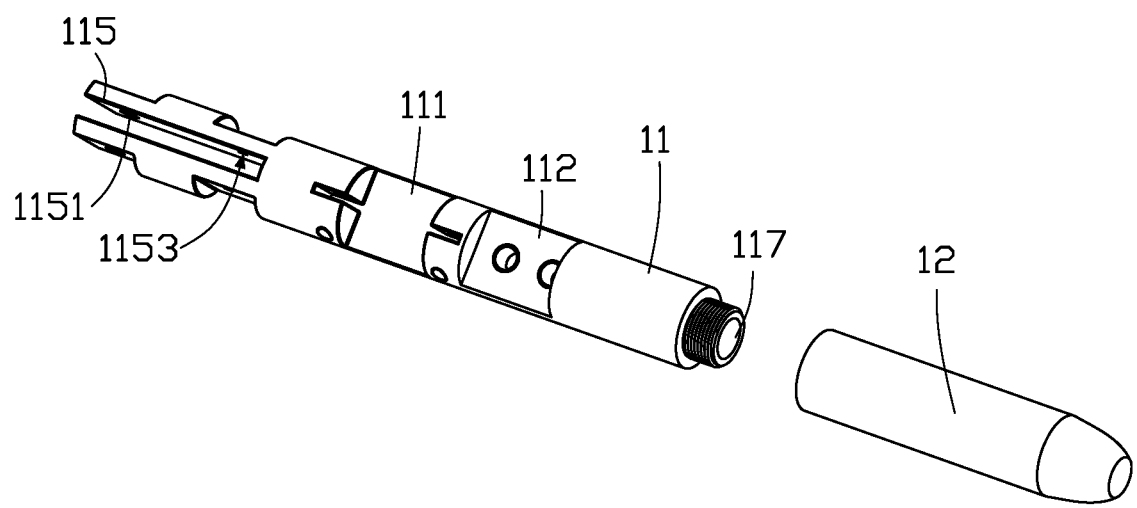
FIG. 8 is a perspective view of a handle of the stripping device of FIG. 1.
Figure 9:
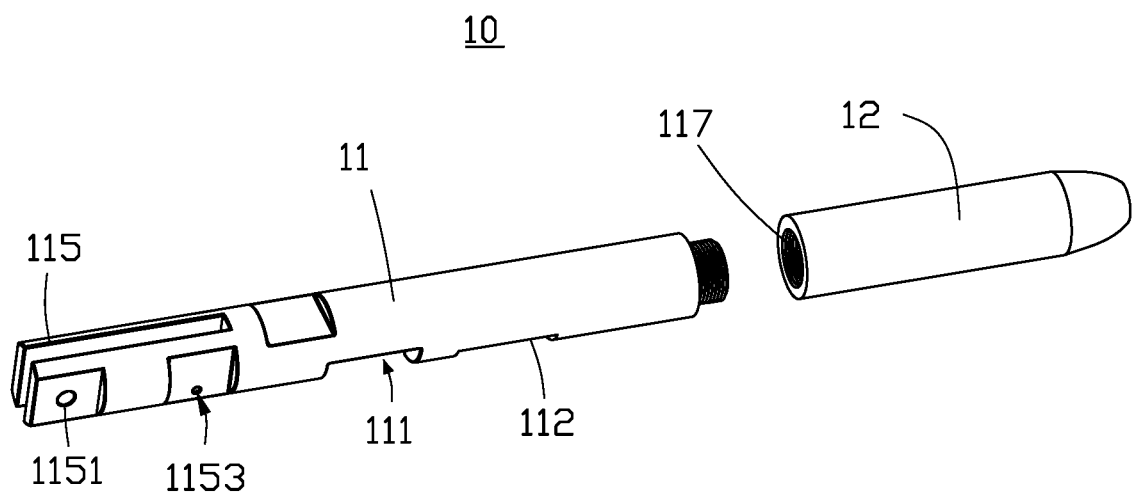
FIG. 9 is similar to FIG. 8, but viewed from another angle.

Referring to FIGS. 8 and 9, the handle 10 defines a through hole 115. The connecting portion 713 is rotatably accommodated in the through hole 115.

The scraper assembly 70 includes a second elastic member 75. One end of the second elastic member 75 is connected with the support section 711, and the other end of the second elastic member 75 is connected with the handle 10.

In one embodiment, the connecting portion 713 includes a connecting section 7131 connected at an angle with the support section 711 and a rotating section 7133 connected at an angle with the connecting section 7131. In one embodiment, the support section 711 is vertical to the connecting section 7131. In one embodiment, the rotating section 7133 is vertical to the connecting section 7131.

In one embodiment, opposite side walls of the through hole 115 each define a first accommodation hole 1151, a rotating shaft 7135 of the rotating section 7133 is rotatably accommodated in the first accommodation hole 1151, so that the scraper assembly 70 is rotatably connected with the handle 10.

In one embodiment, the support section 711 defines a second groove 7111, and a connecting member 77 is accommodated in the second groove 7111.

In one embodiment, an end of the second elastic member 75 is connected with the support section 711 through the connecting member 77. The opposite side walls of the through hole 115 of the handle 10 each further define a second accommodation hole 1153 spaced from the first accommodation hole 1151. A connecting shaft 79 connected with the second elastic member 75 is accommodated in the second accommodation hole 1153, so that an end of the second elastic member 75 is fixedly connected with the handle 10. In one embodiment, an end of the second elastic member 75 is sleeved on the connecting shaft 79.

In one embodiment, a free end of the support section 711 is a dovetail structure, so as to accommodate the cable 200 between the scraper 73 and the handle 10.

When the support section 711 and the connecting portion 713 are rotated, the support section 711 moves away from the handle 10 and drives the scraper 73 and the second elastic member 75 to move away from the handle 10, so as to place the cable 200 between the scraper 73 and the handle 10. At this time, the second elastic member 75 is pulled. After the cable 200 is placed between the scraper 73 and the handle 10, the second elastic member 75 in the tensile state restores and drives the scraper 73 and the support section 711 to move towards the handle 10 to clamp the cable 200, thereby preventing the cable 200 from moving in the stripping process.

Referring to FIGS. 8 and 9, the handle 10 includes a first handle portion 11 and a second handle portion 12 detachably connected with the first handle portion 11. The cutter 30, the first bracket 51, and the second bracket 71 are all disposed on the first handle portion 11.

In one embodiment, an end face of the first handle portion 11 facing the second handle portion 12 and/or an end face of the second handle portion 12 facing the first handle portion 11 is concave and defines a receiving groove 117. Specifically, an end of the first handle portion 11 facing the second handle portion 12 and/or an end of the second handle portion 12 facing the first handle portion 11 has a hollow structure. Components such as the cutter 30, a screwdriver (not shown), or the scraper 73 may be accommodated in the receiving groove 117.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A stripping device comprising:
a handle;
a cutter disposed on the handle;
a pressing assembly comprising a first bracket disposed on the handle and a pressing part slidably arranged on the first bracket and opposite to the cutter; and
a scraper assembly comprising a second bracket disposed on the handle and a scraper disposed on the second bracket;
wherein, the first bracket comprises a support plate disposed on the handle and a stop plate connected at an angle with the support plate and opposite to the cutter, the stop plate defines two sliding grooves, the pressing part comprises two opposite sliding plates and two opposite pressing plates, each of the two opposite sliding plates is slidably accommodated in one of the two sliding grooves, and each of the two opposite pressing plates is connected at an angle with one of the two opposite sliding plates.

2. The stripping device of claim 1, wherein the two opposite pressing plates are located between the stop plate and the cutter.

3. The stripping device of claim 2, wherein the stop plate defines at least one opening spaced from the at least one sliding groove, the pressing part comprises at least one sliding rod disposed on the at least one pressing plate and extending through the at least one opening and at least one first elastic member sleeved on the at least one sliding rod, the at least one first elastic member is located between the stop plate and the at least one pressing plate.

4. The stripping device of claim 2, wherein a surface of the at least one pressing plate facing the cutter defines a plurality of first grooves spaced from each other.

5. The stripping device of claim 2, wherein the first bracket further comprises a connecting plate connected at an angle with the support plate, the handle defines a connecting groove, the connecting plate is accommodated in the connecting groove.

6. The stripping device of claim 2, wherein the pressing part further comprises a pressing head, the pressing head comprises a head, a connecting rod connected with the head, and a connecting block connected with the connecting rod, at least one protrusion is disposed on an end of the at least one sliding plate away from the at least one pressing plate, the at least one protrusion is connected with the connecting block.

7. The stripping device of claim 1, wherein the handle defines a through hole, the second bracket comprises a support section and a connecting portion connected at an angle with the support section, the connecting portion is rotatably accommodated in the through hole.

8. The stripping device of claim 7, wherein the scraper assembly further comprises a second elastic member, an end of the second elastic member is connected with the support section, and another end of the second elastic member is connected with the handle.

9. The stripping device of claim 7, wherein the connecting portion comprises a connecting section connected at an angle with the support section and a rotating section connected at angle with the connecting section, opposite side walls of the through hole define two first accommodation holes, both ends of a rotating shaft of the rotating section are rotatably accommodated in the two first accommodation holes.

10. The stripping device of claim 8, further comprising a connecting shaft connected with an end of the second elastic member, wherein the opposite side walls of the through hole further define two second accommodation holes, both ends of the connecting shaft are fixedly accommodated in the two second accommodation holes.

11. The stripping device of claim 1, wherein the handle defines a receiving groove, the cutter is accommodated in the receiving groove.

12. The stripping device of claim 11, wherein the cutter is a V-shaped blade, a plane blade, or an arcing blade.

13. The stripping device of claim 1, wherein a blade of the scraper is arranged parallel to an axis of the handle.

14. The stripping device of claim 1, wherein the blade of the scraper is crescent-shaped.

15. The stripping device of claim 1, wherein the handle comprises a first handle portion and a second handle portion detachably connected with the first handle portion, all of the cutter, the first bracket, and the second bracket are disposed on the first handle portion.

16. The stripping device of claim 15, wherein at least one of an end face of the first handle portion facing the second handle portion and an end face of the second handle portion facing the first handle portion is concave and defines a receiving groove.

* * * * *